United States Patent [19]
Wilson

[11] Patent Number: 5,829,285
[45] Date of Patent: Nov. 3, 1998

[54] TIRE LOCK

[76] Inventor: Thomas Edward Wilson, 369 Calle Lome Norte, Santa Fe, N. Mex. 87501

[21] Appl. No.: 862,002

[22] Filed: May 22, 1997

Related U.S. Application Data

[63] Continuation of Ser. No. 600,772, Feb. 13, 1996, abandoned.
[51] Int. Cl.$^6$ ................................................. B60R 25/00
[52] U.S. Cl. ............................... 70/226; 70/237; 180/287
[58] Field of Search ............................... 180/287; 70/225, 70/226, 237, 238, 258, 259, 260, 18, 19

[56] References Cited

U.S. PATENT DOCUMENTS

| 1,489,272 | 4/1924 | Murrah | 70/260 |
|---|---|---|---|
| 1,530,622 | 3/1925 | Roberts | 70/18 |
| 3,907,072 | 9/1975 | Shafer . | |
| 4,768,359 | 9/1988 | Wade . | |
| 4,770,013 | 9/1988 | Nakai . | |
| 5,134,868 | 8/1992 | Bethards | 70/226 |
| 5,315,848 | 5/1994 | Beyer | 70/226 |
| 5,372,018 | 12/1994 | Smith | 70/226 |
| 5,673,574 | 10/1997 | Bertram | 70/18 |

FOREIGN PATENT DOCUMENTS

| 608990 | 11/1960 | Canada | 70/19 |
|---|---|---|---|
| 76348 | 5/1983 | Japan | 70/225 |
| 489155 | 1/1985 | United Kingdom | 70/19 |

OTHER PUBLICATIONS

Popular Science, Sep. 1984, p. 93.

Los Angeles Times, Home Edition, p. 3, pt 2, col. 1 Jul. 25, 1989.

"Denver Boot Puts Heed to parking Scoff laws" Denver Business Journal, v 45 n 50, p. 9A Aug. 26, 1994.

"Palma Auto–Boot" Literature—6 pages (date unknown).

*Primary Examiner*—Darnell M. Boucher
*Attorney, Agent, or Firm*—Knobbe, Martens, Olson & Bear, LLP

[57] ABSTRACT

Apparatus and method for obtaining same-day payment of parking violation fines imposed by a municipality or other governmental body, having a tire clamp with a combination lock, to be applied to a tire of the violator's vehicle, and a notice to the vehicle owner, which informs the owner of a phone number to call, to pay the fine by credit card and obtain the combination to the lock, allowing the owner to release the vehicle, after which the vehicle owner clamps the tire clamp around a parking meter or sign post, for later retrieval by police.

3 Claims, 2 Drawing Sheets

---

CAUTION/NOTICE/VIOLATION

THIS VEHICLE HAS BEEN DISABLED BY MEANS OF THE "TIRE LOCK", BECAUSE OF YOUR PARKING VIOLATION. YOU MAY GET THE COMBINATION TO RELEASE THE "TIRE LOCK", BY CALLING 555-5555, AND PAYING THE FINE BY CREDIT CARD. HAVE YOUR CREDIT CARD NUMBER AND THE ID NUMBER OF THE LOCK READY TO GIVE THE OPERATOR. IF YOU HAVE NO CREDIT CARD, THE OPERATOR WILL TELL YOU A LOCATION TO GO TO FOR PAYMENT OF YOUR FINE. AFTER YOU PAY YOUR FINE, YOU WILL BE GIVEN THE COMBINATION TO REMOVE THE LOCK. AFTER YOU REMOVE THE LOCK FROM YOUR VEHICLE, YOU MUST RELOCK THE "TIRE LOCK" AROUND THE NEAREST STREET SIGN OR PARKING METER. WARNING: TAMPERING WITH OR THEFT OF THE "TIRE LOCK" WILL RESULT IN A $500.00 FINE.

CAUTION/NOTICE/VIOLATION

THIS VEHICLE HAS BEEN DISABLED BY MEANS OF THE "TIRE LOCK", BECAUSE OF YOUR PARKING VIOLATION. YOU MAY GET THE COMBINATION TO RELEASE THE "TIRE LOCK", BY CALLING 555-5555, AND PAYING THE FINE BY CREDIT CARD. HAVE YOUR CREDIT CARD NUMBER AND THE ID NUMBER OF THE LOCK READY TO GIVE THE OPERATOR. IF YOU HAVE NO CREDIT CARD, THE OPERATOR WILL TELL YOU A LOCATION TO GO TO FOR PAYMENT OF YOUR FINE. AFTER YOU PAY YOUR FINE, YOU WILL BE GIVEN THE COMBINATION TO REMOVE THE LOCK. AFTER YOU REMOVE THE LOCK FROM YOUR VEHICLE, YOU MUST RELOCK THE "TIRE LOCK" AROUND THE NEAREST STREET SIGN OR PARKING METER. WARNING: TAMPERING WITH OR THEFT OF THE "TIRE LOCK" WILL RESULT IN A $500.00 FINE.

*FIG.2*

TIRE LOCK

This application is a continuation of Ser. No. 08/600,772, filed Feb. 13, 1996 now abandoned.

BACKGROUND OF THE INVENTION

The present invention concerns apparatus and systems for obtaining payment of fines for vehicle parking ordinance violations, and particularly a system for routinely obtaining payment of said fine on the same day as the violation.

The familiar traditional approach of municipalities for enforcement of vehicle parking ordinances, as in the case of a vehicle parked at a parking meter on which the time has expired, has been the issuance of a parking violation citation, commonly termed a "parking ticket", typically placed on the vehicle windshield. The ticket typically informs the vehicle owner of an option to either mail in a check in payment of a designated fine, within a stated period from the date of issuance of the ticket, in the event the owner does not wish to contest the citation; or alternatively to appear in municipal court on a designated date, if the owner does wish to contest the citation. The ticket customarily will warn the owner that he/she will be subject to arrest, through failure to take either of these actions. If the owner fails to mail in the fine within the allowed period, or appear in municipal court on the designated date to contest the citation, the court may issue a bench warrant for the owner's arrest.

In recent years municipalities have encountered an increasingly serious problem with this traditional approach. Many vehicle owners have become aware that because the resources of the police and courts are ever more strained to their limits in dealing with crimes that are far more serious than parking ordinance violations, such as crimes of violence, in many cases an owner may completely ignore a parking ticket, without in fact ever being arrested on a municipal court bench warrant. Local TV news stations and newspapers have often run stories about individual vehicle owners who have received and ignored hundreds or thousands of parking tickets, without having been arrested, and without ever paying these fines. The effect of such media coverage of the problem, has been to make the problem even worse, as more and more people have gotten the idea that parking tickets could be ignored. One consequence of the problem is a significant loss of municipal revenues, which further complicates the fight against serious crime and other problems of modern municipalities.

In an effort to deal with this problem of the traditional approach to parking ordinance enforcement, some municipalities have purchased and used vehicle disabling devices, such as the "Palma Auto-Boot" cited in applicant's information disclosure documents, which may be used to immobilize the vehicle of an owner who has ignored prior parking tickets. A notice is placed on the vehicle, informing the owner to go to the police station and pay the fine and prior fines, after which payment an officer will go to the vehicle location to remove the boot device, to free the vehicle and make the boot available for later use on vehicles of other violators.

Although this procedure has had a beneficial effect, there are several disadvantages to it. First, it requires an officer to go back to the vehicle location to remove the boot, an officer who may well be needed elsewhere on more urgent police business. Second, the device is relatively cumbersome and expensive as compared to the tire lock device of the present invention. There is a need for simpler, less expensive devices, which can be used in a way making the more cumbersome and expensive devices unnecessary in the average case, so that city budgets need not be further strained by costs of large numbers of such cumbersome and expensive devices.

A useful distinction can be made, between the purposes of such cumbersome devices as the Palma boot product, and the purposes of the present invention. A boot device used to immobilize the vehicle of a chronic parking ordinance violator, who has ignored numerous parking tickets with unpaid fines which may total many thousands of dollars, may need to be a rather massive, cumbersome device, for locking security purposes, in order that it will be essentially impossible for most such violators to remove the boot themselves and drive away without paying the fines. Such a chronic violator may be highly motivated to attempt self-removal of the boot, and may have a tool kit in the trunk of the vehicle which can be used in such an effort.

But the present invention addresses a different need. There is a need for a less cumbersome, less expensive tire lock device, with a combination lock, which can be used routinely on the vehicles of first time violators, as part of a system whereby the vehicle owner may easily pay the fine and obtain the combination for unlocking the lock, so that the vehicle owner may release the vehicle, without any need for a police officer to go to the vehicle to free the vehicle from the lock. For this purpose, there is no need for the lock device to be as secure as the type of boot device used with chronic, repeat offenders. A first time violator, facing only a need to make payment of a single parking fine to obtain release of his/her vehicle, will in most cases not be motivated to go to the trouble to try to break the vehicle tire free of the device by self help means; it will be less trouble to simply pay the fine, obtain the combination and unlock the vehicle. And a first time offender will be less likely to become a repeat offender, than under the old parking ticket system, since it is not as easy to remove the tire lock as it is to tear up a parking ticket.

But if the vehicle is to be released without having a police officer go to the scene, there is also a need, which is also addressed by the present invention, as described below, to have a manner in which the vehicle owner may, upon releasing the vehicle, leave the tire lock device for the police in a secure manner, so that it may be used again.

In summary the present invention addresses the needs for a combination tire lock device which is relatively less cumbersome and expensive than the auto boot type products, and therefore easier to attach and remove, and the need for a means to allow the vehicle owner to easily pay the fine and obtain the combination and release the vehicle without any need for a police officer to come to the scene, and the need for the vehicle owner to be able to leave the tire lock device for the police in a secure manner.

The general approach of the present invention, to meeting these needs, as detailed below, is one of using a simple tire clamp with a combination lock, which may be clamped around a tire of the vehicle, and may also be clamped around a parking meter or sign, as a secure way of being left for police, after being removed from the vehicle; and of using such a tire clamp in conjunction with a notice to the vehicle owner, of a city parking authority office phone number to call and pay the fine by giving the number of a credit card to which the fine will be charged, whereupon the clerk of that office will then give the vehicle owner the combination to the lock of the tire clamp, allowing the owner to free the vehicle.

SUMMARY OF THE INVENTION

The present invention is one for routinely obtaining same day payment of parking fines imposed by a municipality, comprising the combination of a clamping means, for clamping on a vehicle tire and for making it at least extremely difficult to move the vehicle without first removing the clamping means; a locking means having a combination lock, for locking said clamping means on said tire to prevent movement of said vehicle; and a notice means, for informing the vehicle owner of procedures for paying the parking fine by phone and obtaining the combination to secure release of the vehicle. In the preferred embodiment, the locking means mechanism has a displayed identification number, to distinguish it from other units of the invention, and has both a combination lock, as well as a master key lock for unlocking by a master key carried by an officer. The clamping means of the preferred embodiment comprises a fixed main bar projecting from the lock mechanism; and a sliding bar with spaced locking increments, which may be slid into and out of the lock mechanism when in the unlocked position, with the main bar and sliding bar forming locking clamps at their ends opposite the locking mechanism, which clamps may be opened or closed with respect to one another, to a maximum separation adequate to allow clamping the device around one rim of the automobile tire, and which may be closed to a much smaller separation, so that the driver may lock the device around a parking meter post or sign post after paying the fine, for later removal by an officer. In the preferred embodiment the notice means is a written notice placed on the automobile windshield, informing the automobile owner that the car has been disabled by the device because of the parking violation, and informing the owner of a phone number to call where the parking ticket, together with any prior unpaid tickets, may be paid by giving a credit card number, and where the owner will then be given the combination to unlock the device, after giving the operator the locking mechanism identification number; and informing the owner to reclamp the device about the nearest parking meter or signpost after removing it from the vehicle. The notice of the preferred embodiment also informs the owner, in case he/she does not have a credit card, of a location to go to, to pay the fine(s) and obtain the combination, after giving the operator the locking mechanism identification number.

BRIEF DESCRIPTION OF THE DRAWINGS

FIG. 2 illustrates the notice of violation and procedure for paying the fine and obtaining the combination for release of the clamping means, of the preferred embodiment.

DESCRIPTION OF THE PREFERRED EMBODIMENT

Figure 1:
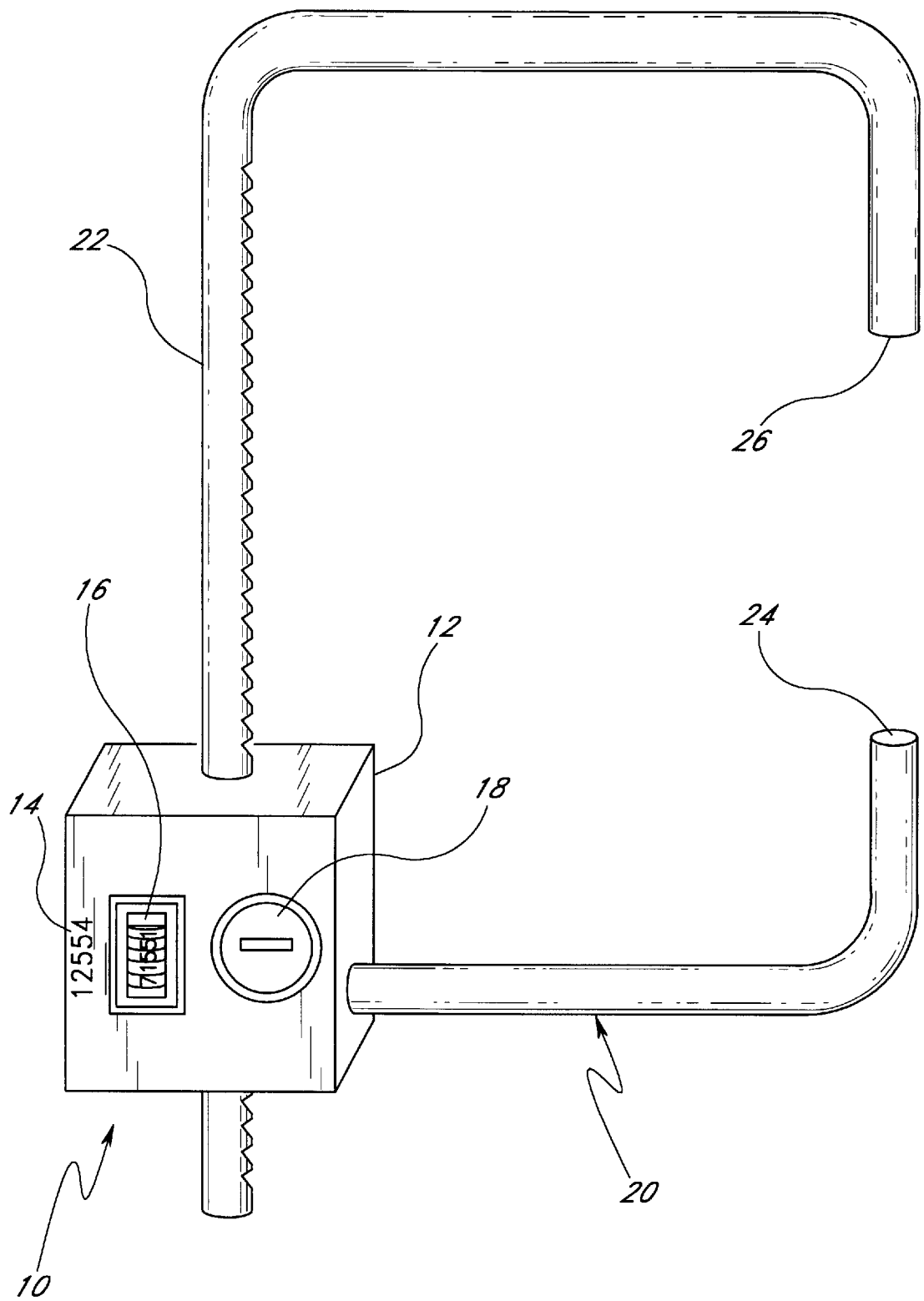
FIG. 1 is a perspective view of the clamping and locking means of the preferred embodiment.

Referring now to the drawings, the principal components of the preferred embodiment are the clamping means and locking means shown in FIG. 1, and the notice means shown in FIG. 2.

The locking means is a lock 10, housed in a housing 12, having a visible identification number 14, which distinguishes each particular unit of the invention from each other unit. The lock 10 has a combination mechanism 16, of a kind well known in the art, whereby lock 10 may be unlocked by dialing in the correct combination. The lock 10 also has a master key mechanism 18, which can unlock lock 10 independently, whereby all of the lock and clamp devices may be retrieved by officers after being left locked around the support posts of parking meters or traffic signs, without having to work the combination mechanisms 16.

The clamping means is formed by two bars which protrude from housing 12 of lock 10, a main bar 20, and a sliding bar 22, which passes entirely through housing 12. The main bar 20 is permanently attached to and within the housing 12 of lock 10, in fixed position relative to housing 12. The sliding bar 22 is slidable within a channel passing through housing 12, in small locking increments, such as ½" increments, and is locked into a specific position, by locking the lock 10. The main bar 20 and sliding bar 22 protrude from adjacent faces of housing 12, and are curved in the manner indicated in FIG. 1, with main bar 20 having one 90 degree curve near its end opposite housing 12, said curve being in a direction parallel to the portion of sliding bar 22 passing through housing 12, and with sliding bar 22 having two 90 degree curves lying in the plane of main bar 20 and sliding bar 22, with a section parallel to main bar 20, and another section turning back toward the outer end of main bar 20. The outer ends of main bar 20, and sliding bar 22, opposite housing 12, face one another to form a locking spacer point 24 at the end of main bar 20, and another locking spacer point 26 at the end of sliding bar 22. The ends of main bar 20 and sliding bar 22 having the locking spacer point 24 and the locking spacer point 26, form the locking clamp portion of the clamping means of the preferred embodiment. The dimensions of main bar 20 and sliding bar 22 are such that the spacing between the locking spacer point 24 and the locking spacer point 26, may be varied between a size large enough to permit locking around a vehicle tire, such as a spacing of the order of 12", and a much smaller size of the order of 1", to permit locking around a sign post, parking meter or lamp support post, for later retrieval by police. The thickness of the main bar 20 and the sliding bar 22 should be sufficient for adequate strength, while yet producing a device which is not too cumbersome. Applicant believes that a thickness range of roughly ⅝" to ¾" would be suitable, if the bars are made of a strong metal like steel, for example. The simplicity and less cumbersome aspect of the bar structure of the clamping means, as compared to the Palma auto boot product, yields a device which is easier to place and remove.

The notice means, shown in FIG. 2, is a paper violation notice, which may be placed by the police officer on the vehicle windshield, to advise the vehicle owner that the vehicle has been disabled by the tire lock because of the owner's parking violation, and to advise the owner how to obtain the combination to allow him to release his vehicle, by telephone, by phoning a clerk at an office of the municipal parking authority, to both pay the fine by credit card and obtain the combination in the same phone call, as soon as the fine payment by credit card has been authorized.

The police officer simply clamps and locks the tire lock to the vehicle tire to initiate the process, and need not return to the scene to free the vehicle. As shown in FIG. 2, the notice instructs the vehicle owner to simply lock the device around the nearest street sign or parking meter, after removing it from the vehicle. Thus a police officer may retrieve the tire lock at any convenient later time. Indeed in areas of high parking citation activity, a number of the tire locks may be normally left in place locked around parking meters and street signs, and only retrieved by officers when actually needed for later parking citation imposition.

When the vehicle owner calls the clerk at the municipal parking authority office to charge the fine to a credit card, the exact amount of the fine may not be known with certainty to the clerk, if the owner is uncertain as to the nature of the parking violation, e.g. overtime parking or unauthorized use of a handicapped parking space. The clerk need not take the owner's word for the nature of the violation, but can inform the owner that the amount of the fine will be determined from the fine indicated on the parking citation turned in by the officer, which will be matched to the lock identification number 14 given by the owner. The clerk can also take the owner's motor vehicle license number, as a further means for matching to the officer's parking citation, which will normally also have the license number. The clerk can, in this same conversation, answer the owner's questions as to the amounts of fines imposed for various parking violations, from a printed schedule of fines in the clerk's office. There is nothing uncommon about credit card authorization for charges, the exact amount of which may be determined later, e.g. when minibar charges are added to a guest's total charges for a hotel room, after the guest has already checked out, when the remaining minibar stock is inventoried to determine the minibar charges.

If the vehicle owner does not have a credit card, the municipal parking authority clerk can, in the same phone conversation, give the addresses of one or more locations the owner can go to, by walking or taxi, to pay the fine and obtain the combination in order to be able to free the vehicle.

The housing 12 is a cube of sufficient size as to make it extremely difficult to drive the vehicle without removing the device from the vehicle tire. A cube 3" on a side is believed to be a suitable size.

In case a repeat offender might make a record of the combinations of tire lock units used for citations on which he has paid fines, so as to try to avoid paying a fine again if he finds a unit used on his vehicle before, the lock 10 contains a mechanism, of a form well known in the lock arts, whereby the police may regularly change the combinations of the various tire lock units.

Those familiar with the art will appreciate that the invention may be employed in configurations other than the specific forms disclosed herein, without departing from the essential substance thereof.

For example, and not by way of limitation, although the housing 12 is cubic in the preferred embodiment, there is no inherent reason that other shapes might not be used instead. It is believed that shapes of rectangular cross section, not limited to cubic, would be preferable to shapes having smooth surfaces such as an ellipsoid of revolution, for purposes of making it very difficult to drive the vehicle away with the tire lock still attached to the tire.

Similarly, although the main bar 20 and the sliding bar 22 protrude from adjacent faces of the cubic housing 12, in the preferred embodiment, the invention is not limited to such a configuration. It would be possible to have them protrude from opposite sides of housing 12, with the portion of sliding bar 22 which passes through housing 12 being slightly displaced from the portion of main bar 20 within housing 12, but with the dimensions of the various parts of main bar 20 and sliding bar 22 being chosen such that locking spacer point 24 and locking spacer point 26 would lie on the line of motion of locking spacer point 26 when sliding bar 22 is moved with respect to housing 12 and main bar 20.

Although a thickness range of ⅝" to ¾" would be suitable for the main bar 20 and the sliding bar 22 if these bars are made of a strong metal like steel, this range is disclosed for "enabling disclosure" purposes, and is not intended to define fixed outer limits on the thickness of these bars, which might be employed without departing from the essential substance of the invention.

Although the notice means of the preferred embodiment is a violation notice placed on the vehicle windshield by the offer who applies the tire lock to the vehicle tire, the invention is not limited to use of this particular notice means. For example, a sign might me securely attached to the housing 12 of lock 10, containing the same information. This would obviate the need for the officer to place a notice on the windshield.

Similarly the invention is not limited to the use of any particular material in its fabrication. The clamping means and locking means should be fabricated of a quite strong material, and steel would certainly be appropriate. However other lighter metals or metal alloys of sufficient strength, or even plastics of sufficient strength, might be used instead. Although the notice means could be a printed paper notice placed on the vehicle windshield, if instead the notice means is a sign securely attached to the housing 12 of lock 10, the notice means might, for durability, be painted on a piece of sheet metal, or could be printed on paper and laminated in plastic.

Nor is the invention limited to a particular choice of the size of the housing 12 of lock 10, so long as it is large enough to make it very difficult to move the vehicle with the tire lock on the tire. Although a side dimension of about 3" would probably be adequate, this dimension could be made larger.

The scope of the invention is defined by the following claims, including also all subject matter encompassed by the doctrine of equivalents as applicable to the claims.

I claim:

1. A method for a person to remove a clamp locked to a tire of the vehicle comprising the steps of:

contacting a remote location via telephone;

communicating an account designation via telephone;

receiving a combination for a lock via telephone for unlocking said lock;

manipulating said lock to enter said combination, thereby unlocking said lock;

releasing said clamp from said tire of said vehicle; and locking said clamp to a fixed structure with said lock.

2. The method of claim 1, further comprising the step of communicating a lock identifier to said remote location via telephone.

3. The method of claim 1, wherein said fixed structure comprises one of a parking meter and a sign post.

* * * * *